Jan. 26, 1943  A. F. JOHNSON  2,309,596
COUPLING STRUCTURE
Filed June 21, 1939  2 Sheets-Sheet 1
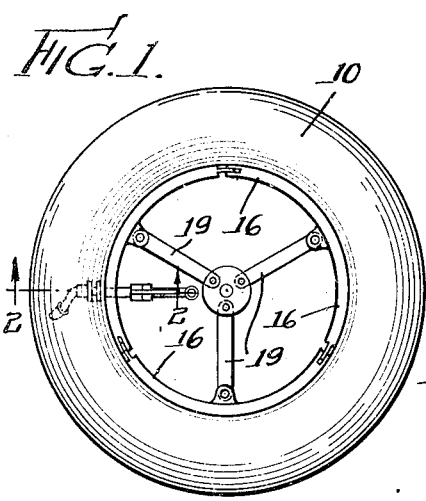
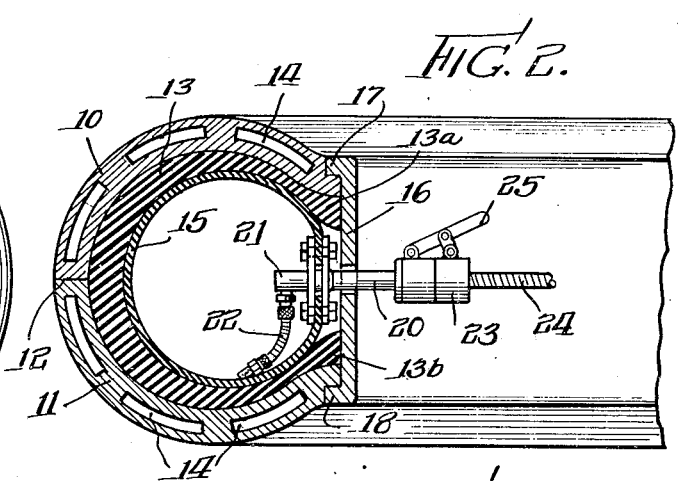
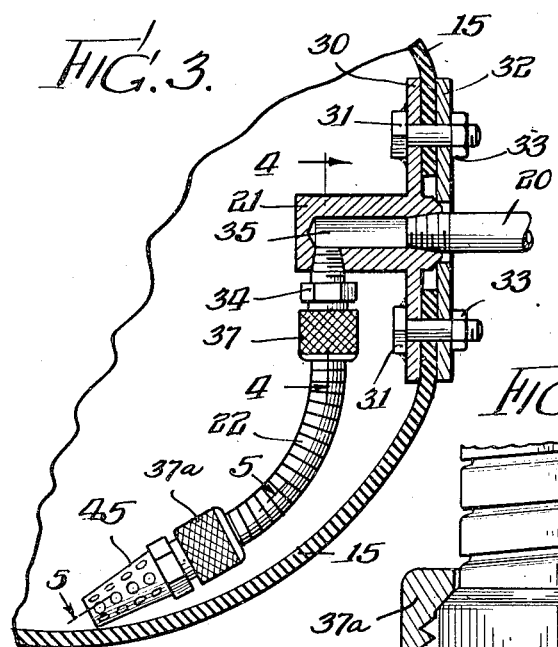
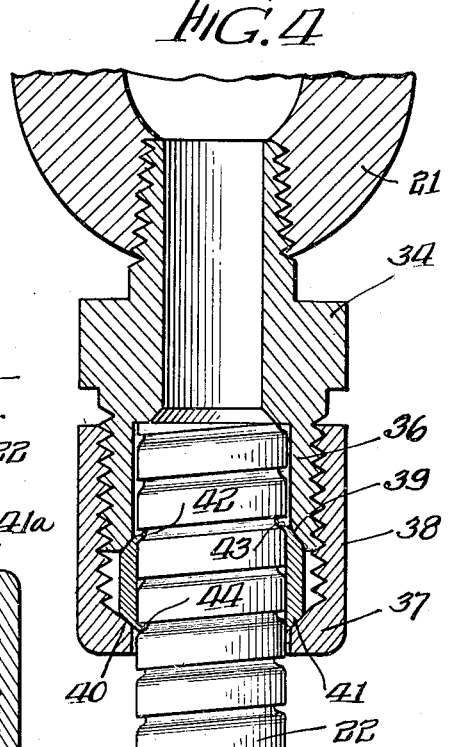
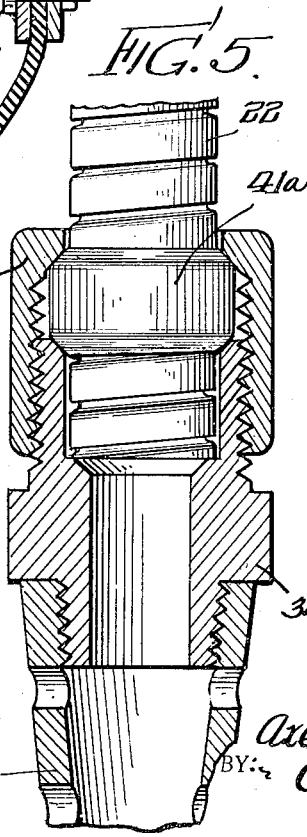
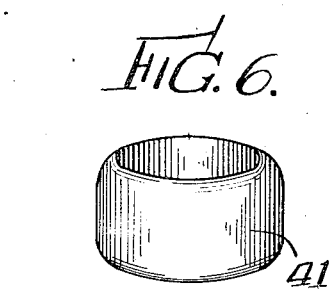
INVENTOR.
Axel Fredrick Johnson
BY Cox & Moore
ATTORNEYS Jan. 26, 1943  A. F. JOHNSON  2,309,596
COUPLING STRUCTURE
Filed June 21, 1939  2 Sheets-Sheet 2
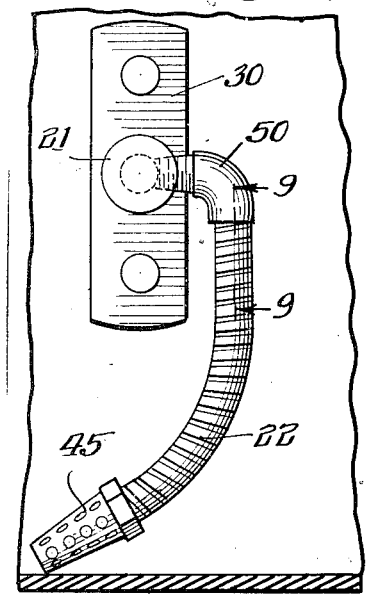
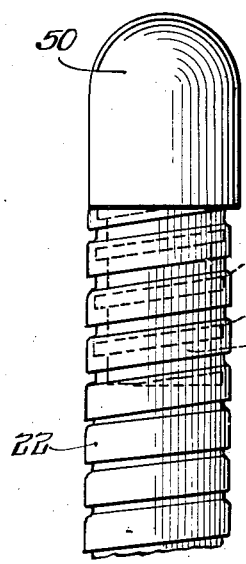
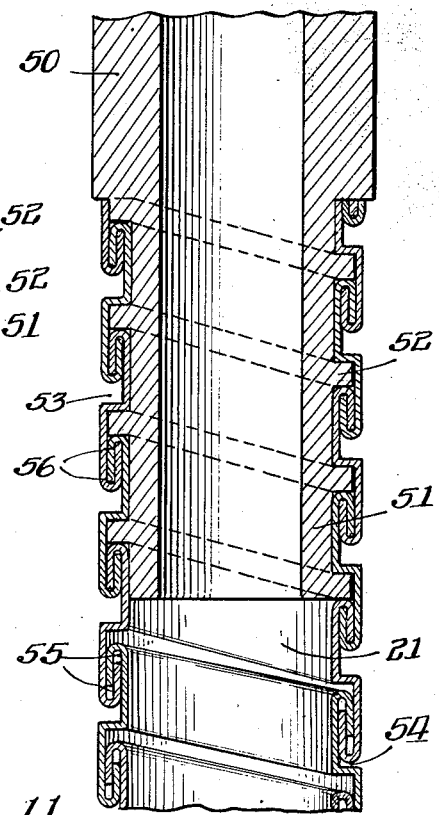
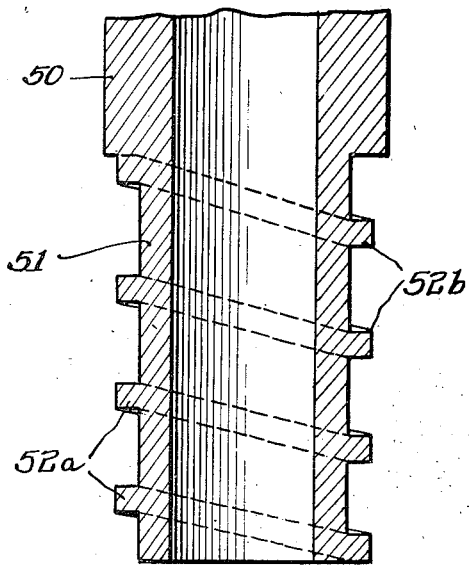
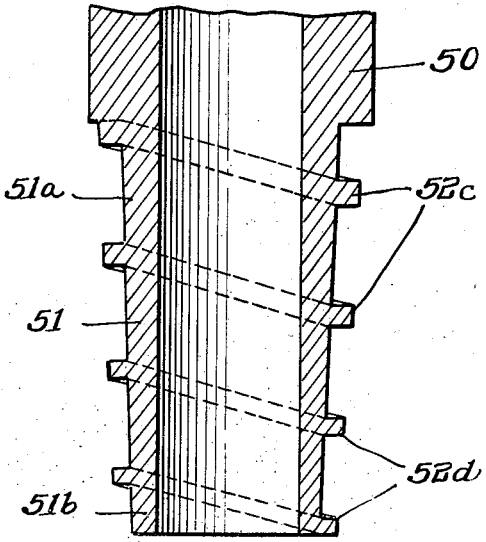
INVENTOR.
Axel Fredrick Johnson
BY: Cox & Moore
ATTORNEYS.

Patented Jan. 26, 1943

2,309,596

UNITED STATES PATENT OFFICE 2,309,596

COUPLING STRUCTURE

Axel Fredrick Johnson, Chicago, Ill., assignor to Chicago Metal Hose Corporation, Maywood, Ill., a corporation of Illinois Application June 21, 1939, Serial No. 280,345

6 Claims. (Cl. 285—86)

This invention relates to coupling constructions, and particularly to coupling constructions of the reattachable type.

It is an object of the invention to provide a reattachable coupling construction of improved structure and operating characteristics.

More specifically, it is an object of the invention to provide a coupling construction of the type stated which will permit reuse of the coupling, in whole or in part, in the event of breakage or replacement of the tubing parts with which the coupling is associated.

A further object of the invention is to provide a coupling structure of the type stated which may be applied to the associated tubing, assembled, or replaced without the use of special tools or the like.

In accordance with the invention the coupling means and associated parts are such that the coupling may be attached to an associated tubing portion manually and without brazing or soldering operations.

A still further object of the invention is to provide coupling means of the type stated which will not restrict the opening of the tubing when applied, and which will not pull off or otherwise become dislodged from the tubing even during rough usage of the construction under conditions of varying temperature.

A still further object of the invention is to provide coupling means of the foregoing character, particularly adapted for use with tire bag evacuators and the like.

Other objects, advantages and features of the invention will appear from the following specication when taken in connection with the accompanying drawings wherein certain preferred embodiments of the invention are illustrated.

In the drawings, wherein like reference numerals refer to like parts throughout:

Fig. 1 is a plan view of a tire curing or vulcanizing unit incorporating a coupling structure constructed in accordance with one form of the invention Fig. 2 is an enlarged sectional view of the construction shown in Fig. 1, on the line 2—2 thereof.

Fig. 3 is a detail view, on a further enlarged scale, of a portion of the evacuator mechanism of the structure shown in Fig. 2.

Figs. 4 and 5 are sectional views on the lines 4—4 and 5—5 respectively of Fig. 3, and still further enlarged to show the nature of the coupling means in this form of the invention.

Fig. 6 is a detail view of a part of the coupling means shown in Figs. 4 and 5.

Fig. 7 is a partial detail view illustrating a modified form of tire bag evacuator and coupling construction.

Fig. 8 is a detail view, on an enlarged scale, of the coupling means as embodied in this form of the invention Fig. 9 is a sectional view of the coupling means and associated tubing on a further enlarged scale, on the line 9—9 of Fig. 7, and Figs. 10 and 11 are partial detail views illustrating further modified forms of coupling constructions.

Referring specifically to the drawings, and first to the structures shown in Figs. 1 to 6 inclusive, the tire curing or vulcanizing unit illustrated, to which the coupying structures of the invention are shown applied by way of illustrative example, comprises a pair of metal casing members 10 and 11 separable vertically at a point of juncture indicated by the reference numeral 12 (Fig. 2), and adapted collectively to embrace the outer surface of the tire or the like 13 to be treated. The casing members 10 and 11 may be provided with passages 14 adapted to be connected to any suitable source of steam or hot water supply by means of which the casing members are heated to effect the tire treating operation.

The inner surface of the tire is adapted to be engaged by a tire bag 15 of suitable flexible material, such as rubber or the like. A plurality of metal backing members 16 close the space between the casing members 10 and 11 along the inner rim portions thereof, and serve as a reinforcing means for the inner rim portion of the tire bag where it is not in engagement with the surfaces of the tire 13. The backing members 16 are provided with flanges 17 and 18 adapted to grip the edge portions of the casing members 10 and 11. As best shown in Fig. 1, there are three backing members 16 which together form a complete circumferential backing assembly, the backing members being adapted to be moved radially inwardly by means of suitable operating mechanism 19 to cause the flanges 17 and 18 thereof to release the casing members.

A pipe member 20 passes through one of the backing members 16 and through the wall of the tire bag and terminates at its inner end into a pipe cap member 21. This cap member is in turn connected to a piece of flexible metal tubing 22, the end of which is adapted to lie within the tire bag at the lowest point thereof. The outer end of the pipe 20 is connected by means of a quick detachable coupling 23 to a flexible conduit 24 which communicates with a suitable source of steam supply under pressure, the quick detachable coupling being operable by means of a handle lever 25.

In the operation of the foregoing construction the tire bag 15 is first introduced into the tire 13 to be treated, into the position shown in Fig. 2. The tire bag is introduced into the tire between the rim portions 13a and 13b thereof, the flexible material of the tire bag yielding to permit this insertion through the relatively narrow space between the tire rim portions. During this insertion operation the flexible tubing 22 also yields or bends to prevent puncture of the tire bag. The tire with the bag arranged therein is then placed into the lower casing member 11, after which the upper casing member 10 is lowered into cooperating position as shown in Fig. 2. The backing members 16 are then radially expanded, causing the flanges 17 and 18 thereof to grip and lock the casing members 10 and 11 in position. The steam conduit 24 is connected to the pipe 20 by means of the quick detachable coupling 23, and steam is thereupon introduced into the tire bag. Simultaneously suitable heating medium such as steam or the like is introduced into the ports 14 of the casing members 10 and 11 thereby causing heat to be applied to both the exterior and interior surfaces of the tire 13 to effect the treating operation such as tire curing or vulcanizing.

After the treating operation has been completed, the conduit 24 is disconnected from its source of supply and is connected to a suitable point of exhaust. The steam pressure within the tire bag thereupon causes an evacuation of the heating medium from the tire bag interior. Due to the fact that the end of the flexible tube 22 lies at the lowermost portion of the tire bag, the water condensate which may have been introduced along with the steam into the bag or which may have condensed in the bag during the treating operation is forced or exhausted from the bag by the steam pressure, and at the end of the exhausting operation there will remain in the bag only steam at atmospheric pressure or a small amount of condensate resulting therefrom. The quick detachable coupling is then opened and backing members 16 and the casings 10 and 11 separated, after which the tire and tire bag may be removed therefrom. The tire bag is then withdrawn from the tire, conditioning the apparatus for operation upon the next tire to be treated.

In an apparatus such as above described it is essential that the end of the tubing 22 lie at the lowermost position within the tire bag to effect a satisfactory evacuation of the heating medium. At the same time the tubing 22 must be flexibly arranged to permit the introduction into and the withdrawal of the tire bag from the tire through the relatively restricted opening provided by the rim portions 13a and 13b. The flexible tubing 22 is thus subjected to a considerable amount of bending and twisting in the operation of the apparatus, and frequently it is very roughly handled in commercial service. Also, it is subjected to conditions of elevated temperature during the tire treating operations. The flexible tubing 22 is preferably of stainless steel, and of spirally wound interlocked construction, as will be later described, but even when so constructed frequent breakage occurs.

An apparatus of the type described thus constitutes an illustrative type of mechanism to which coupling means such as provided by the present invention has particular applicability. If the flexible tubing is connected to the other parts of the conduit system, such as the cap member 21, by means of a brazed or soldered or other permanent coupling connection, the replacement of the flexible tubing after breakage is a laborious and time consuming operation, and also necessitates the discarding of the associated conduit parts. On the other hand in accordance with the invention reattachable coupling means is provided whereby the flexible tubing 22 is coupled at its ends in a reattachable manner and by means which may be operated manually either by the operator's fingers or by the use of elementary tools. Not only are maintenance and repair operations simplified, but the coupling constructions and the associated conduit parts may be reused necessitating discarding only of the piece of flexible metal tubing which has broken. At the same time the reattachable means provided by the invention satisfies all of the requirements of the coupling means for an installation of the character described.

Referring particularly to Fig. 3, it will be seen that the pipe member 20 is connected to the cap 21 by means of a threaded connection. The cap member is provided with a flange 30 of the shape best shown in Fig. 7, this flange being adapted to carry a pair of bolts 31 for securing the cap member to the wall of the tire bag More specifically, the bolts project through a cooperating plate member 32 held upon the bolts by means of the nuts 33, the wall of the tire bag being adapted to be gripped between the flange 30 and the plate 32 to hold the parts in position.

Referring now to the coupling structure, a coupling body 34 is threaded into the end of the cap 21 in communication with the longitudinal bore 35 thereof. The lower or outer end of the coupling body terminates in a threaded sleeve 36 which carries a threaded clamping member 37, as best shown in Fig. 4. The clamping member may be knurled on its exterior surface as indicated at 38 whereby to facilitate its manual rotation. As also best shown in Fig. 4, the end of the sleeve 36 is provided with a tapered surface 39, and the end of the clamping member is provided with a similar but oppositely extending tapered surface 40 for gripping engagement with tapered surfaces on the marginal ends or edges of a ring or band member 41 embracing and anchored to the flexible tubing 22.

In the assembly of the coupling construction the coupling body 34 is first threaded into the cap 21 by means of a wrench or other suitable tool. The clamping member 37 is then slipped onto the flexible tubing after which the ring member 41 is arranged thereon in the position which it should occupy in the assembled construction. The ring or band member 41 is slightly larger than the exterior surface of the flexible tubing so that it may be readily moved into proper position. The clamping member 37 is then threaded onto the coupling body causing the tapered surfaces 39 and 40 to grip the cooperating tapered surfaces of the ring member forcing it into tight gripping engagement with the body of the flexible tubing. During this clamping operation the extreme marginal edges of the ring member are deformed and forced into the convolutions of the tubing, into firm locking engagement therewith, as indicated at 42, 43 and 44 in Fig. 4. As previously stated, the flexible tubing is preferably of stainless steel to impart maximum strength to the tubing under conditions of elevated temperature, and it is preferably of the spirally wound interlock type as best shown in Fig. 4. The interlocked convolutions of the tubing may be connected by any desired type of interlocking or interconnected flanges and need not be packed as it is not essential that the tube be absolutely fluid-tight. The coupling parts may be of brass or the like, as is commonly the case in coupling structures.

In the event that the flexible tubing 22 should break, the nuts 33 may be loosened and the cap member 21 withdrawn from the interior of the tire bag to render the coupling and tubing accessible. The coupling can then be disassembled by manually unscrewing the clamping member 37 after which a new piece of flexible tubing and a new ring 41 is placed in position and the member reassembled. This repair operation may be readily carried out by the user or operator of the apparatus, and without special tools. With the exception of the broken flexible tubing and the relatively inexpensive ring member 41, all of the parts may be reused resulting in maximum economy. At the same time the coupling construction satisfies all of the requirements of the installation. It is sufficiently fluid-tight, and due to the gripping projections 42, 43 and 44, the coupling is positively locked upon the tubing preventing it from becoming pulled off even when subjected to rough usage. As the construction is subjected to elevated temperatures, the brass of the coupling may expand more than the stainless steel of the flexible tubing, but even though such operation takes place, the positive locking projections 42, 43 and 44 preclude inadvertent pulling out of the tubing from the coupling construction. Moreover, the coupling is of such nature that it does not in any way break down the wall of the flexible tubing or otherwise constrict the tubing as is frequently the case in coupling constructions of the pressed-on type.

As shown in Fig. 3, the lower end of the flexible tubing is provided with a nozzle or strainer member 45, and preferably this nozzle member is secured to the tubing by means of a reattachable coupling construction similar to that previously described. To this end, as best shown in Fig. 5, the nozzle member 45 may be threaded onto a coupling body 34a similar to the coupling body 34 previously described, this coupling body cooperating with a clamping member 37a and a tubing ring 41a constructed and functioning in a manner such as previously described in reference to the construction shown in Fig. 4. In the event that the tubing 22 breaks, the nozzle may be reassembled upon a new piece of tubing readily and with a reuse of all the coupling parts with the exception of the ring 41a.

In Figs. 7, 8 and 9 a modified form of coupling structure is illustrated. In this instance the cap member 21 is provided with a horizontal threaded bore in its outer end rather than a vertical bore as shown in Fig. 3, and an elbow coupling body 50 is threadedly secured thereto. As best shown in Figs. 8 and 9, the coupling body 50 is provided at its outer or lower end with a sleeve extension 51 upon which a helical thread 52 is formed adapted to be threaded into and interlocked with the convolutions of the flexible tubing 22. The pitch of the thread 52 is somewhat greater than the pitch of the helical convolutions of the tubing when the tubing is in normal or contracted position. Accordingly as the coupling sleeve 51 is threaded into the tubing the convolutions thereof are expanded or extended as shown in Fig. 9, the space 53 between the expanded convolutions being greater than the space 54 between the convolutions when in normal contracted position, and the expansion spaces 55 of the convolutions being absorbed as indicated at 56. This extension or expansion of the tubing convolutions produces a binding action between the convolutions of the tubing and the thread 52. The binding action is insufficient to prevent the threading of the coupling into the tubing as the tubing convolutions tend to open or unwind during the assembly operation and the parts may be readily threaded into position; but if attempt is made to unthread the coupling from the tubing after the parts have been brought into assembled relation, the frictional drag of the thread 52 and the coupling extension 51 upon the tubing convolutions during the unwinding operation tends to contract or more tightly wind the convolutions causing them to be brought into firm gripping engagement with the tubing extension and thereby preventing withdrawal of the tubing except by the application of some authorized force such as the application of wrenches or suitable tools to the coupling and tubing parts, or the application of a definite manual rotative force. In order words, after assembly the tubing is prevented from pulling off of the coupling or unthreading therefrom due to vibration, tubing twisting or otherwise inadvertent forces. The degree of binding action may be controlled by predetermining the width of the thread 52, by predetermining the outer diameter of the thread 52 with respect to the diameter of the tubing convolutions, or by predetermining the diameter of the coupling sleeve 51 with respect to the internal diameter of the tubing, the purpose being to provide the proper amount of binding action between the tubing convolutions and the coupling extension so that the parts may be easily assembled as the tubing convolutions tend to unthread or open up during the assembly operation, but the binding action being sufficient to prevent inadvertent disassembly of the parts due to the contraction or coiling up of the tubing convolutions which takes place during unwinding operations.

In Fig. 10 a structure is shown generally similar to that illustrated in Fig. 9, but in this instance the pitch between the threads 52a at the lower end of the coupling extension may be made equal to the pitch of the tubing convolutions when the tubing is in normal contracted position, the pitch of the thread becoming increasingly greater so that the pitch between the upper portion of the thread as indicated at 52b is greater than the normal pitch of the tubing convolutions. With a construction of this character the threading of the coupling extension into the end of the tubing is facilitated, only the upper thread sections 52b being relied upon to anchor the coupling within the hose.

In Fig. 11 a further modified form of construction is shown wherein not only is the pitch of the thread varied, but the width and outside diameter of the thread, and the outside diameter of the coupling sleeve are also varied or tapered to secure the locking action. More specifically, the upper thread portions 52c are in this instance not only of increased pitch as compared with the lower thread portions 52d, but the upper thread portions are also of increased width and of increased outside diameter to secure the locking action. The upper portion 51a of the sleeve 51 may also in this instance be of increased diameter with respect to the lower sleeve portion 51b. With a construction of this character the end portion of the sleeve and the thread thereon are so arranged as to permit easy entrance into the tubing, and the inner or upper thread and sleeve portions produce the locking action. It is obvious that any combination of the expedients mentioned may be utilized to secure the desired locking action between the coupling and the tubing convolutions.

It will be seen that in the embodiments of the invention described in connection with Figs. 7 to 11 inclusive, a coupling of the reattachable type is provided which will permit the user of the apparatus to reattach and reuse a coupling with a new piece of flexible tubing in the event of tubing breakage. The coupling may be screwed into the tubing by hand without special tools. The coupling is sufficiently tight to satisfy the requirements of the installation, and it does not constrict or otherwise deform the flexible tubing. Also there is no danger that it will be pulled from the tubing even when subjected to elevated temperatures. The nozzle member 45 may be secured to the flexible tubing by means of a similar coupling connection, or as described in connection with the embodiment of the invention shown in Fig. 5.

It is obvious that various changes may be made in the specific embodiments of the invention set forth for purposes of illustration without departing from the spirit thereof, and that the coupling structures may be used in other types of apparatus than that specifically set forth. Accordingly the invention, and the various subcombinations or features thereof, are not to be limited to the precise embodiments, arrangements, and uses described, but only as indicated in the following claims.

The invention is hereby claimed as follows:

1. A coupling connection for flexible metal tubing of the corrugated type comprising a deformable metal band embracing the tubing, said band being provided with a substantially cylindrical bore and at either end thereof with tapered surfaces forming feathered marginal edges, and a pair of coupling members adapted to grip said tapered surfaces and hold the band in firm engagement with the tubing, said feathered marginal edges being deformed as an incident to the application of said coupling members to the band into the tubing corrugations whereby to form a positive lock therewith.

2. A coupling construction for flexible metal tubing of the helical convoluted type comprising a coupling body having a sleeve extension adapted to be arranged in telescoping relation with the tubing, said extension being provided with a helical screw thread adapted to have threaded connection with the convolutions of the tubing, at least a portion of the screw thread being of greater thickness than the spacing between adjacent tubing convolutions when the tubing is in normal contracted position, whereby the tubing convolutions are brought into frictional gripping engagement with the screw thread to provide a reattachable coupling connection.

3. A coupling of flexible metal tubing of the type formed from spirally wound, interconnected metal strip, wherein the spiral convolutions of the tubing are yieldable through predetermined limits to permit the flexing of the tubing, said coupling including a sleeve portion having a screw thread formed thereon conforming generally to the helical convolutions of the tubing and adapted to interlock therewith, but shaped in deviation from the spiral of the tubing when in normal unextended position whereby to provide a helical path of travel for the tubing during coupling assembly imparting a progressively increasing frictional resistance between the coupling sleeve and the tubing as the tubing is screwed onto the sleeve, the tubing convolutions tending to open as the hose is screwed onto the sleeve to facilitate assembly, and to close into tightened engagement with the sleeve to resist withdrawal.

4. A coupling as defined in claim 3, wherein said shaping includes the shaping of a portion of said screw thread of different pitch than the pitch of the convolutions of the tubing when the tubing is in normal position.

5. A coupling as defined in claim 3, wherein said shaping includes the shaping of a portion of said screw thread of different crest diameter than the internal diameter of the crest-engaged tubing portions when the tubing is in normal position.

6. A coupling as defined in claim 3, wherein said shaping includes the shaping of a portion of said screw thread of different base diameter than the internal diameter of the base-engaged tubing portions when the tubing is in normal position.

AXEL FREDRICK JOHNSON.